US012658071B2

(12) United States Patent (10) Patent No.: US 12,658,071 B2
Liu et al. (45) Date of Patent: Jun. 16, 2026

(54) ARTIFICIAL INTELLIGENCE VIRTUAL SIGN LANGUAGE AVATAR INTERPRETER

(71) Applicant: INTERNATIONAL BUSINESS MACHINES CORPORATION, Armonk, NY (US)

(72) Inventors: Su Liu, Austin, TX (US); Geeth Ranmal de Mel, Warrington (GB); Hamid Majdabadi, Ottawa (CA); Peng Hui Jiang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 450 days.

(21) Appl. No.: 18/326,037

(22) Filed: May 31, 2023

(65) Prior Publication Data

US 2024/0404429 A1    Dec. 5, 2024

(51) Int. Cl.
G09B 21/00 (2006.01)
G06T 13/40 (2011.01)
(Continued)

(52) U.S. Cl.
CPC ............ G09B 21/009 (2013.01); G06T 13/40 (2013.01); G06V 40/174 (2022.01); G06V 40/28 (2022.01); H04N 7/152 (2013.01)

(58) Field of Classification Search
CPC .... G09B 21/009; G06T 13/40; G06V 40/174; G06V 40/28
(Continued)

(56) References Cited

U.S. PATENT DOCUMENTS

2003/0069997 A1     4/2003  Bravin
2014/0046661 A1*    2/2014  Bruner ............... H04N 21/6582
                                             704/235
(Continued)

FOREIGN PATENT DOCUMENTS

KR          100819251 B1      4/2008
KR        20210026006 A      3/2021
(Continued)

OTHER PUBLICATIONS

International Searching Authority, "Notification of Transmittal of the International Search Report and the Written Opinion of the International Searching Authority, or Declaration," Patent Cooperation Treaty, Aug. 21, 2024, 13 pages, International Application No. PCT/EP2024/061359, IBM Docket No.- P202301093PCT01.
(Continued)

*Primary Examiner* — Pierre E Elisca
(74) *Attorney, Agent, or Firm* — Steven M. Bouknight

(57)                ABSTRACT

According to one embodiment, a method, computer system, and computer program product for detecting, interpreting, and translating sign language is provided. The present invention may include responding to a detection of an active web conference, by analyzing a user's profile and profiles of an audience of the web conference; capturing gestures and spoken language of a presenter using one or more Internet of Things devices; processing the captured gestures and the spoken language of the presenter to interpret the gestures and the spoken language of the presenter; translating the gestures and the spoken language of the presenter into sign language; generating a digital avatar; and displaying the digital avatar along with dynamic sign language movements using the digital avatar.

17 Claims, 4 Drawing Sheets

(51) Int. Cl.
    *G06V 40/16*      (2022.01)
    *G06V 40/20*      (2022.01)
    *H04N 7/15*       (2006.01)

(58) Field of Classification Search
    USPC .......................................................... 434/10
    See application file for complete search history.

(56)            References Cited

U.S. PATENT DOCUMENTS

| | | | |
|---|---|---|---|
| 2014/0309806 A1* | 10/2014 | Ricci ........................ | G06F 21/31 |
| | | | 701/1 |
| 2014/0310739 A1* | 10/2014 | Ricci .................... | G06F 16/951 |
| | | | 725/75 |
| 2015/0120293 A1* | 4/2015 | Wohlert .................. | G10L 21/10 |
| | | | 704/235 |
| 2015/0339790 A1* | 11/2015 | Robinson ................ | G06F 40/40 |
| | | | 704/2 |
| 2016/0062987 A1 | 3/2016 | Yapamanu | |
| 2017/0116883 A1* | 4/2017 | Wohlert .............. | G10L 21/0364 |
| 2018/0182375 A1* | 6/2018 | Fomin ................... | G10L 15/005 |
| 2020/0074886 A1* | 3/2020 | Robinson ................. | G09B 5/02 |
| 2020/0335083 A1* | 10/2020 | Wan ......................... | G06N 3/09 |
| 2022/0343576 A1 | 10/2022 | Marey | |
| 2024/0330582 A1* | 10/2024 | Zhao ....................... | G06F 40/30 |
| 2024/0404429 A1* | 12/2024 | Liu ......................... | G06V 40/28 |

FOREIGN PATENT DOCUMENTS

| | | | |
|---|---|---|---|
| WO | 2015/160849 A1 | 10/2015 | |
| WO | 2018/052901 A1 | 3/2018 | |
| WO | 2019094618 A1 | 5/2019 | |
| WO | 2021/076136 A1 | 4/2021 | |
| WO | 2024/245649 A1 | 12/2024 | |

OTHER PUBLICATIONS

Chijioke, "IBM Metaverse: The Future of Virtual Collaboration, " Dipprfit [online], Feb. 27, 2023 [accessed on May 1, 2023], 6 pages, Retrieved from the Internet: <URL: https://www.dipprofit.com/discover-IBM-metaverse/>.

Disclosed Anonymously, "Audiovisual to Sign Language Translator," IP.com [prior art database], Jul. 19, 2018, 9 pages, IP.com No. IPCOM000254652D, Retrieved from the Internet: <URL: https://priorart.ip.com/IPCOM/000254652>.

Disclosed Anonymously, "Automated Bidirectional Interpreter to Translate Speech/Text into Sign Language," IP.com [prior art database], Jul. 22, 2020, 4 pages, IP.com No. IPCOM000263016D, Retrieved from the Internet: <URL: https://priorart.ip.com/IPCOM/000263016>.

Disclosed Anonymously, "Signing avatar with cultural characteristics," IP.com [prior art database], Apr. 23, 2012, 3 pages, IP.com No. IPCOM000216896D, Retrieved from the Internet: <URL: https://priorart.ip.com/IPCOM/000216896>.

Disclosed Anonymously, "System and Method to Improve Online Meeting for Deaf and Hard of Hearing People," IP.com [prior art database], Feb. 25, 2021, 3 pages, IP.com No. IPCOM000265098D, Retrieved from the Internet: <URL: https://priorart.ip.com/IPCOM/000265098>.

Efthimiou, et al., "Sign Language technologies in view of Future Internet accessibility services," 11th PErvasive Technologies Related to Assistive Environments Conference [conference paper], Jun. 2018, 8 pages, ResearchGate, DOI: 10.1145/3197768.3201546, Retrieved from the Internet: <URL: https://www.researchgate.net/publication/326023784_Sign_Language_technologies_in_view_of_future_internet_accessibility_services>.

Farooq, et al., "Advances in machine translation for sign language: approaches, limitations, and challenges," Neural Computing and Applications [article], May 2021, 44 pages, ResearchGate, DOI:10.1007/s00521-021-06079-3(, Retrieved from the Internet: <URL: https://www.researchgate.net/publication/351919265_Advances_in_machine_translation_for_sign_language_approaches_limitations_and_challenge S>.

Grand View Research, "Video Conferencing Market Size, Share & Trends Analysis Report By Component (Hardware, Software), By Deployment (On-premise, Cloud), By Enterprise Size, By Application, By End-use, By Region, And Segment Forecasts, 2022-2030," Grand Review Research [online], [accessed on May 4, 2023], 11 pages, Retrieved from the Internet: <URL: https://www.grandviewresearch.com/industry-analysis/video-conferencing-market#>.

IBM Accessibility, "Accessibility is a team effort." IBM [online], [accessed on May 4, 2023], 2 pages, Retrieved from the Internet: <URL: https://www.IBM.com/able/>.

IBM Garage Methodology, "Get started with remote collaboration," IBM [online], [accessed on May 1, 2023], 11 pages, Retrieved from the Internet: <URL: https://www.IBM.com/garage/method/practices/culture/remote-collaboration/.

Wen, et al., "AI enabled sign language recognition and VR space bidirectional communication using triboelectric smart glove," Nature Communications [article], 2021, 13 pages, vol. 12, Issue 1, 10.1038/s41467-021-25637-w, Retrieved from the Internet: <URL: https://www.nature.com/articles/s41467-021-25637-w>.

* cited by examiner

100

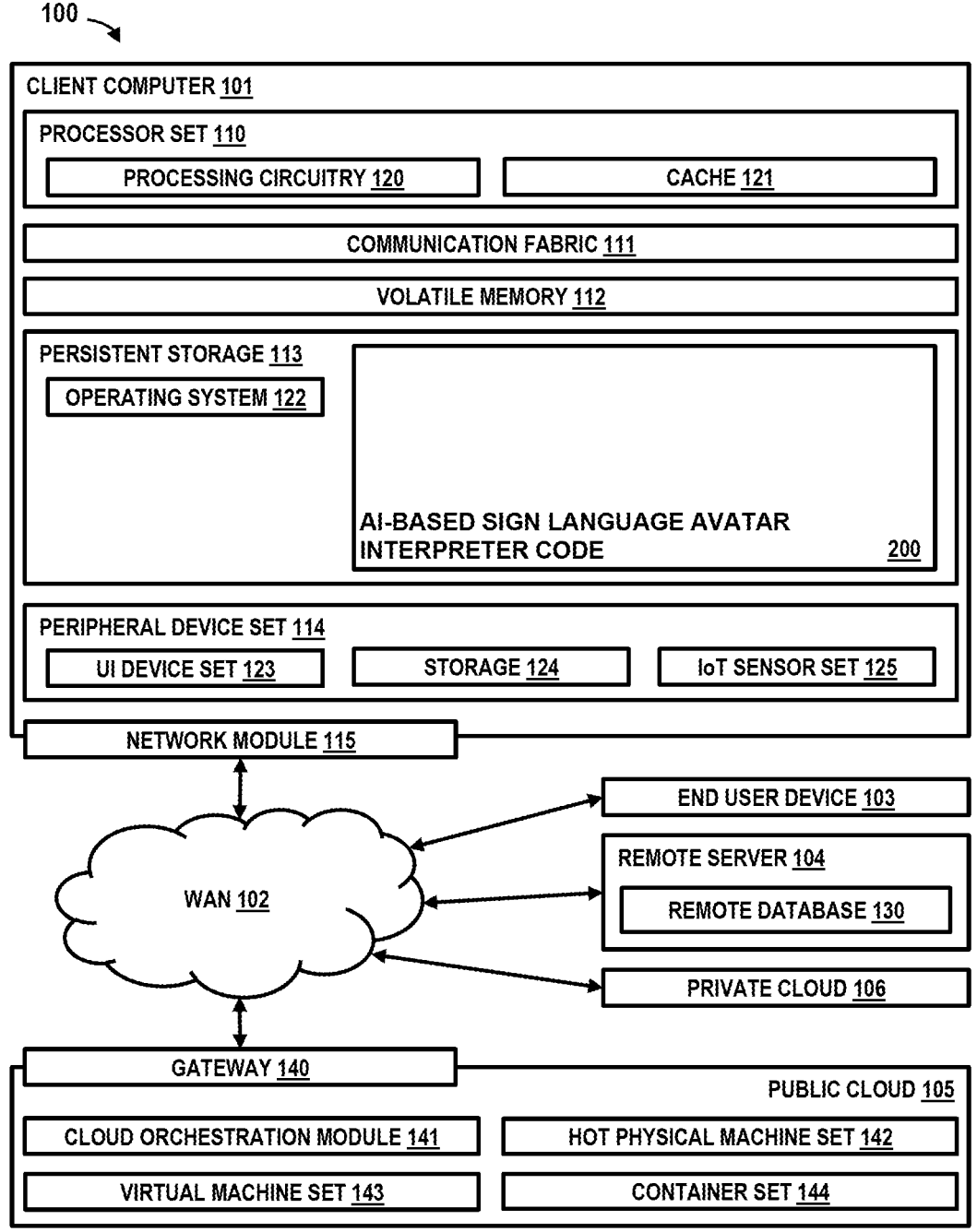

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

AI-BASED SIGN LANGUAGE AVATAR
INTERPRETER CODE                              200

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOT PHYSICAL MACHINE SET 142

VIRTUAL MACHINE SET 143          CONTAINER SET 144

FIGURE 1

ARTIFICIAL INTELLIGENCE VIRTUAL SIGN LANGUAGE AVATAR INTERPRETER

BACKGROUND

The present invention relates, generally, to the field of computing, and more particularly to artificial intelligence.

Artificial intelligence ("AI") is a field of computing that combines computer science and robust datasets to problem solve. AI can be used to create expert systems which can make predictions or classifications based on input data. Currently, AI can be used to extract video data from multimedia data and convert the video data into motion data for control of a digital avatar, thus, allowing the gestures of a person to be mimicked on a digital interface. This means that persons who use sign language can communicate online in their natural language. However, in order for a truly inclusive virtual communication experience, a method and system by which deaf user(s) and the type of sign language they are using can be identified, sign language can be translated to the type of sign language that a user understands, and the translated sign language can be depicted on a digital avatar, are needed. Thus, an improvement in AI has the potential to benefit sign language users and the communicative abilities of web conferences by providing the ability to translate different types of sign language and displaying the translated sign language to user(s) in a web conference.

SUMMARY

Embodiments of a method, a computer system, and a computer program product are described. According to one embodiment, a method, computer system, and computer program product for detecting, interpreting, and translating sign language is provided. The present invention may include responding to a detection of an active web conference, by analyzing a user's profile and profiles of an audience of the web conference. The present invention may include capturing gestures and spoken language of a presenter using one or more Internet of Things devices. The present invention may include processing the captured gestures and the spoken language of the presenter to interpret the gestures and the spoken language of the presenter. The present invention may include translating the gestures and the spoken language of the presenter into sign language. The present invention may include generating a digital avatar. The present invention may include displaying the digital avatar along with dynamic sign language movements. The present invention provides the advantage of generating a personalized and customized digital avatar as an on-demand interpreter on top of a web conference, detecting a type of sign language used by a presenter, and translating voice language and/or sign language to a type of sign language that a user communicates using. A permissive embodiment of the present invention may include determining if one or more members of the audience of the web conference communicate using sign language. A permissive embodiment of the present invention may include switching, dynamically, the generated digital avatar based on real-time events and speech identification.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary networked computer environment according to at least one embodiment;

DETAILED DESCRIPTION

Figure 2:
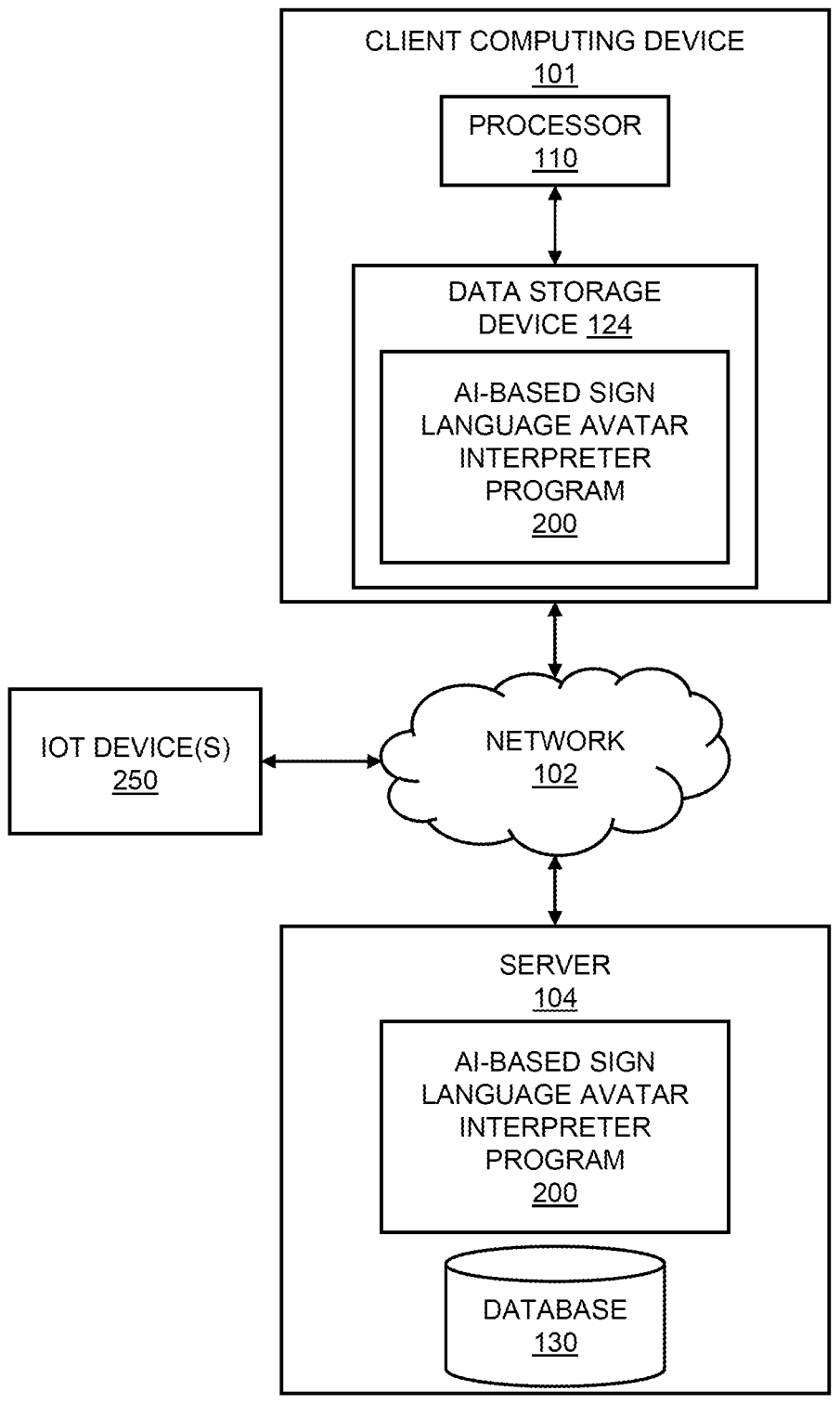
FIG. 2 illustrates an exemplary application invention environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Sign languages are fully-fledged natural languages, with their unique grammar and lexicon, that use the visual-manual modality to convey meaning, instead of spoken words. Furthermore, there are over three-hundred different sign languages used around the world. Therefore, it may be likely that the sign language used by a presenter on a digital platform, such as a web conference, is not the type of sign language that one or more members of the audience understand. Additionally, presenters may not be aware of members of the audience that require sign language to communicate. To further improve the virtual communication experience of people over the internet, there is a need to detect if there are members in a virtual audience that require sign language and the type of sign language they understand, translate the sign language used by a presenter to the type of sign language understood by one or more members, and generate the appropriate sign language movements on a digital avatar.

Currently, the prior art attempts to assist people who communicate using sign language with various methods. One way in which current methods attempt to address problems with virtual sign language translation and interpretation is by assigning a real sign language interpreter to participate in a web conference. For example, some video conferencing platforms have the option to be assigned a human participant during a web conference to translate a presenter's speech into sign language for one or more members of the conference. However, using a sign language interpreter is expensive, because of the need to hire a human participant, and time-consuming, because of the required preparation needed by the interpreter and the meeting organizers before the web conference. Another way in which current methods attempt to address problems with virtual sign language translation and interpretation is by extracting audio data from a video file. The prior art can convert the extracted audio data to text data, and generate and control movements of an avatar based on the converted data. However, the prior art is unable to detect the type of sign language used by a presenter and cannot be used dynamically, such as in a live web conference. Therefore, shortcomings still remain in the area of virtual sign language translation and interpretation. It is important that the type of sign language used by a presenter can be dynamically determined, interpreted, and translated based on the type of sign language member(s) of an audience understand. Thus, an improvement in AI has the potential to benefit sign language users and the communicative abilities of web conferences by providing the ability to translate different types of sign language and displaying the translated sign language to user(s) in a web conference.

The present invention can remedy the above-mentioned deficiencies in the prior art by detecting if there are members of an audience in a virtual conference who communicate using sign language and the type of sign language those members understand, determining and translating the sign language used by a presenter to the type of sign language understood by the one or more members in the audience, and dynamically generating the appropriate sign language movements on digital avatars. The present invention can create a personalized digital avatar that may be displayed alongside a web conference. The present invention can detect a web conference's audio and visual data, and more specifically, a presenter's gestures and facial expressions, using IoT devices. The present invention can use machine learning models and natural language processing algorithms to process the captured data from the IoT devices and to detect the type of sign language used by a presenter. Additionally, the present invention can use machine learning models to detect if one or more members of the audience of the web conference communicate using sign language and the type(s) of sign language those members understand.

The present invention has the capacity to improve artificial intelligence by providing a truly inclusive virtual communication experience during a web conference. The present invention can detect the types of sign language understood by one or more members of a virtual audience, translate the sign language used by a presenter to the type(s) understood by each member of the audience, and generate a digital avatar that displays the gestures of the type of sign language understood by members in the audience. This improvement in AI can be accomplished by implementing a system that responds to a detection of an active web conference, by analyzing a user's profile and profiles of an audience of the web conference, captures gestures and spoken language of a presenter using one or more Internet of Things devices, processes the captured gestures and spoken language of the presenter to interpret the gestures and the spoken language of the presenter, translates the gestures and the spoken language of the presenter into sign language, generates a digital avatar, and displays the digital avatar and dynamic sign language movements. An embodiment in which the system determines if one or more members of the audience of the web conference communicate using sign language has the advantage of translating the sign language used by a presenter to the specific type(s) of sign language understood by one or more members. An embodiment in which the system switches the generated digital avatar dynamically based on real-time events and speech identification may also be useful for web conferences in which multiple presenters are presenting.

In some embodiments of the invention, the AI-based sign language avatar interpreter code, "the program", may automatically and dynamically be deployed in response to the detection of an active web conference. The program can be integrated with a video conferencing platform as a plug-in/ add-on/extension so that the program can access the video and audio streams of a video conference. The program can detect that a web conference is occurring using speech recognition and object detection techniques. The program can detect and collect a web conference's audio and visual data using IoT devices. Visual data may comprise facial expressions, hand movements. etc. Audio data may comprise voices.

In some embodiments of the invention, the program may analyze a user's profile, the profiles of members in the audience of the web conference, and other contextual information using classification machine learning algorithms. The classification machine learning algorithms can identify the members of an audience's voice language, such as English, Japanese, Chinese, etc., and/or sign language, such as English, Japanese, Chinese, etc., based on the information in the user's/members' profiles. A user's profile may comprise specific information, such as the age, gender, and the type(s) of sign language the user understands. Additionally, the user profile may comprise user preferences, such as digital avatar placement, types of digital avatars, module speaker and video preferences, etc. A user may comprise a person who is using the program. The profiles of the members of the audience may comprise the same kinds of specific information and preferences as a user's profile. A member of the audience may comprise the other persons who are present in the web conference on a different computing device and have the program integrated with a video conferencing platform as a plug-in/add-on/extension. The program can system query the user's preferences during the sign-in process to detect, identify, and display a user's preferred digital avatar and to assign the digital avatar a sign language package. A sign language package may be a set of files that provide quality, contextual translations for the languages in the package. Other forms of contextual information may comprise the location of a user, time of the meeting, agenda of the web conference, etc.

In some embodiments of the invention, the program may use machine learning models to determine if one or more members of the audience of the web conference require sign language to communicate and the type(s) of sign language the members of the audience understand. The program may determine that one or more members of the audience of the web conference communicate using sign language based on the program's analysis of the user's profile, the profiles of the members in the audience of the web conference, and contextual information.

In some embodiments of the invention, the program may use machine learning models and natural language processing algorithms to process the captured data from the IoT devices, analyze the processed data, and determine the type of sign language used by a presenter. The program can dynamically analyze the collected IoT data from the IoT devices to interpret the gestures and/or spoken language(s) of a presenter at the web conference. A presenter may comprise a person who is speaking at a web conference. The IoT devices can detect the gestures and facial expressions of a presenter. Additionally, the IoT devices can capture a presenter's voice. The program can identify a presenter's voice language, such as English, Japanese, Chinese, etc., and sign language, such as American Sign Language, Australian Sign Language, French Sign Language, etc., based on the collected IoT data. The program can use machine learning models, such as deep learning algorithms, and natural language processing algorithms, to process the captured data from the IoT devices and to determine the type of sign language used by a presenter. The program can train the machine learning models and natural language processing algorithms using language data and training data. Language data may comprise sign language samples and voice samples that are uploaded to the program. The sign language samples can be tagged with the type of sign language that each sample is. Additionally, voice samples can be mapped to their respective sign language samples. Training data can comprise video streams and audio streams that are uploaded to the program. For each video stream, the program can analyze the video stream and convert the sign language gestures to text. The program can analyze the text and can generate the corresponding type of sign language. For each audio stream, the program can analyze the audio stream and can convert the speech into text. The program can analyze the text and can generate the corresponding type of sign language.

In some embodiments of the invention, the program may create a dynamically generated AI sign language interpretation avatar, otherwise referred to as a digital avatar, based on a user's preferences. The digital avatar can interpret the content of a web conference. More specifically, the digital avatar can dynamically mimic the gestures and facial expressions of a presenter, in the type of sign language understood by the user. The program can generate a digital avatar using AI-based computer graphics software. The program may dynamically translate the interpreted gestures and/or spoken language of the presenter into the type of sign language that the user understands. The program can use the trained machine learning models to interpret the spoken language and translate it into sign language. The program can analyze the audio stream and can convert the speech into text. The program can analyze the text and can generate the corresponding type of sign language. Additionally, if a presenter is communicating using sign language, the program can analyze the video stream and convert the sign language gestures to text. The program can analyze the text and can generate the corresponding type of sign language. The program may continuously update the machine learning models and the natural language processing algorithms based on user feedback. User feedback may comprise feedback related to the program's performance in its interpreting and translating of spoken language and sign language, and the displaying of digital avatars. The program may dynamically switch a digital avatar based on real-time events and speech identification, such as the program detecting that a new presenter who speaks/signs a different type of language than the previous presenter begins presenting. The program may switch the digital avatar to a different digital avatar that can translate the language of a presenter to the type of sign language that a user understands, such as by switching the sign language package that the digital avatar comprises.

In some embodiments of the invention, the program may display a digital avatar along with the appropriate sign language gestures based on the detected sign language(s) of a presenter and the members of the audience of the web conference who communicate using sign language. The program can dynamically display the digital avatar and corresponding sign language movements on the user's screen during the web conference. The program can integrate the digital avatar into the video conferencing platform, such that the avatar appears alongside the video stream of a presenter. The program may display the translated sign language on a small screen embedded alongside the web conference. Additionally, any digital avatars that are generated for users in the audience of the web conference may be available for other members in the audience of the web conference to select as their preferred display option. The available digital avatars may be selectable in a drop-down list by a user on the user's graphical user interface.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to respond to a detection of an active web conference, by analyzing a user's profile and profiles of an audience of the web conference, capture gestures and spoken language of a presenter using one or more Internet of Things devices, process the captured gestures and spoken language of the presenter to interpret the gestures and the spoken language of the presenter, translate the gestures and the spoken language of the presenter into sign language, generate a digital avatar, and display the digital avatar and dynamic sign language movements.

Referring to FIG. 1, an exemplary networked computer environment 100 is depicted, according to at least one embodiment. Computing environment 100 contains an example of an environment for the execution of at least some of the computer code involved in performing the inventive methods, such as AI-based sign language avatar interpreter code 200. In addition to code block 200 computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 200 in persistent storage 113.

COMMUNICATION FABRIC 111 is the signal conduction path that allows the various components of computer

101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in code block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Referring to FIG. 2, an exemplary application environment is depicted, according to at least one embodiment. FIG. 2 may include client computing device 101 and a remote server 104 interconnected via a communication network 102. According to at least one implementation, FIG. 2 may include a plurality of client computing devices 101 and remote servers 104, of which only one of each is shown for illustrative brevity. It may be appreciated that FIG. 2 provides only an illustration of one implementation and does not imply any limitations with regard to the environments in which different embodiments may be implemented. Many modifications to the depicted environments may be made based on design and implementation requirements.

Client computing device 101 may include a processor 110 and a data storage device 124 that is enabled to host and run an AI-based sign language avatar interpreter program 200 and communicate with the remote server 104 via the communication network 102, in accordance with one embodiment of the invention.

The remote server computer 104 may be a laptop computer, netbook computer, personal computer (PC), a desktop computer, or any programmable electronic device or any network of programmable electronic devices capable of hosting and running an AI-based sign language avatar interpreter program 200 and a database 130 and communicating with the client computing device 101 via the communication network 102, in accordance with embodiments of the invention. The remote server 104 may also operate in a cloud computing service model, such as Software as a Service (SaaS), Platform as a Service (PaaS), or Infrastructure as a Service (IaaS). The remote server 104 may also be located in a cloud computing deployment model, such as a private cloud, community cloud, public cloud, or hybrid cloud.

The database 130 may be a digital repository capable of data storage and data retrieval. The database 130 can be present in the remote server 104 and/or any other location in the network 102. The database 130 can store previously generated AI sign language interpretation avatars and their movement data. Additionally, the database 130 may store data relating to the types of sign language and the gestures used, and their meaning(s), in each type of sign language. The database 130 may store linguistic data and language data for every verbal language and sign language. The database 130 may store the machine learning models, as well as the training data used to train the machine learning models. Also, the database 130 may store sign language packages.

Internet of things ("IoT") devices 250 may be any device capable of continuously capturing gestures, facial expressions, and voices. The IoT device(s) 250 can comprise cameras, such as any device capable of recording visual images in the form of photographs, films, or video signals, such as a physical or virtual camera, and/or sensors, such as accelerometers, gyroscopes, magnetometers, proximity sensors, pressure sensors, etc.

According to the present embodiment, AI-based sign language avatar interpreter code 200, "the program", may be a program capable of responding to a detection of an active web conference, by analyzing a user's profile and profiles of an audience of the web conference, capturing gestures and spoken language of a presenter using one or more Internet of Things devices, processing the captured gestures and spoken language of the presenter to interpret the gestures and the spoken language of the presenter, translating the gestures and the spoken language of the presenter into sign language, generating a digital avatar, and displaying the digital avatar and dynamic sign language movements. The program 200 may be located on client computing device 101 or remote server 104 or on any other device located within network 102. Furthermore, the program 200 may be distributed in its operation over multiple devices, such as client computing device 101 and remote server 104. The AR ship route determination method is explained in further detail below with respect to FIG. 3.

Figure 3:
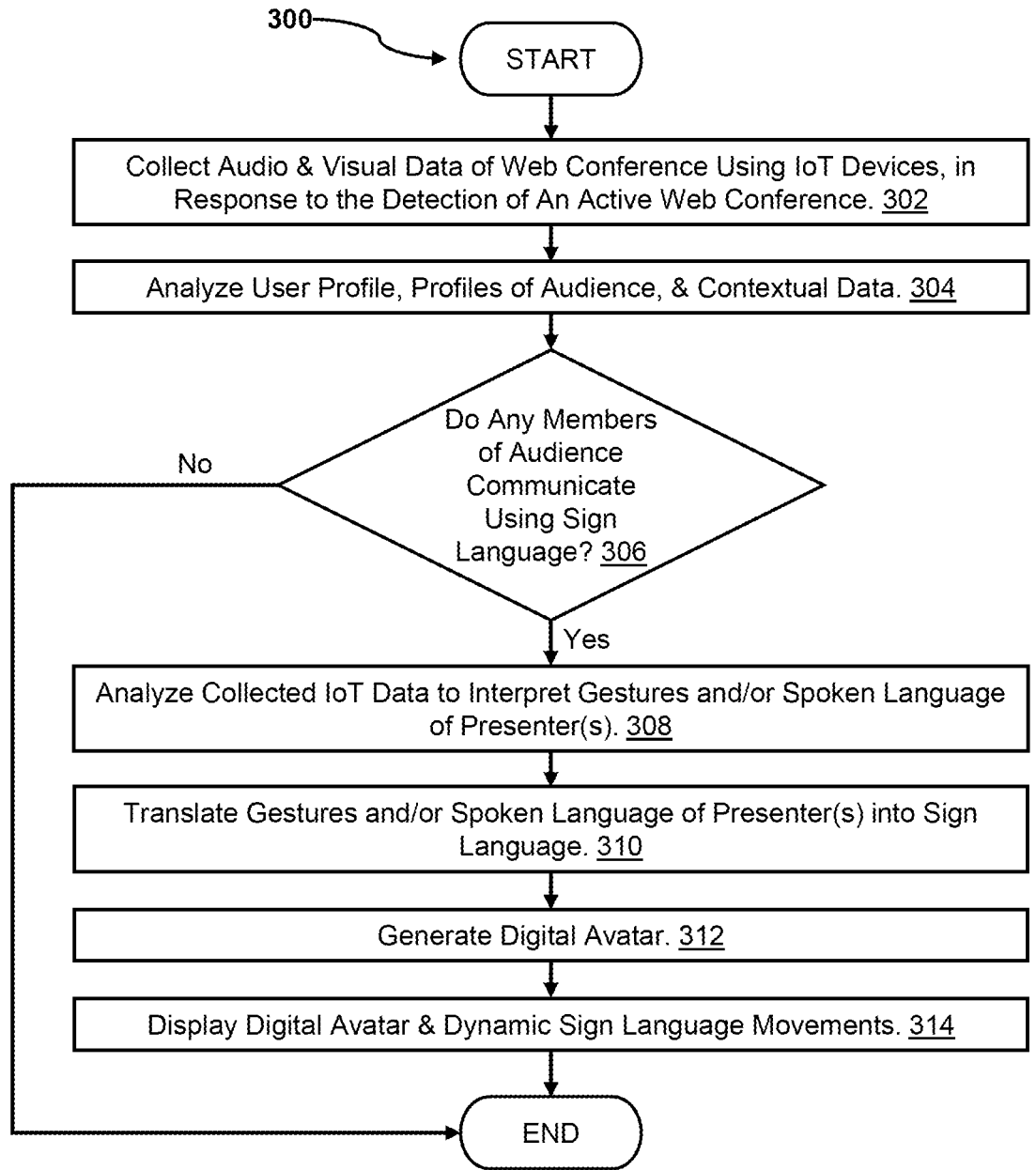
FIG. 3 is an operational flowchart illustrating an AI-based sign language avatar interpreter process according to at least one embodiment.

Referring now to FIG. 3, an operational flowchart illustrating an AI-based sign language avatar interpreter determination process 300 is depicted according to at least one embodiment. The program 200 can automatically and dynamically be deployed in response to the detection of an active web conference. The program 200 can be integrated with a video conferencing platform as a plug-in/add-on/extension so that the program 200 can access the video and audio streams of a video conference. The program 200 can detect that a web conference is occurring using speech recognition and object detection techniques. At 302, the program 200 collects audio and visual data of the web conference using IoT devices 250. Visual data may comprise facial expressions, hand movements. etc. Audio data may comprise voices.

At 304, the program 200 analyzes the user's profile, the profiles of the members of the audience of the web conference, and other contextual information using classification machine learning algorithms. The classification machine learning algorithms can identify the members of an audience's voice language, such as English, Japanese, Chinese, etc., and/or sign language, such as English, Japanese, Chinese, etc., based on the information in the user's/members' profiles. A user's profile may comprise specific information, such as the age, gender, and the type(s) of sign language the user understands. Additionally, the user profile may comprise user preferences, such as digital avatar placement, types of digital avatars, module speaker and video preferences, etc. A user may comprise a person who is using the program 200. The profiles of the members of the audience may comprise the same kinds of specific information and preferences as a user's profile. A member of the audience may comprise the other persons who are present in the web conference on a different computing device and have the program 200 integrated with a video conferencing platform as a plug-in/add-on/extension. The program 200 can system query the user's preferences during the sign-in process to detect, identify, and display a user's preferred digital avatar and to assign the digital avatar a sign language package. A sign language package may be a set of files that provide quality, contextual translations for the languages in the package. Other forms of contextual information may comprise the location of a user, time of the meeting, agenda of the web conference, etc.

Then, at 306, the program 200 determines if one or more members of the audience of the web conference communicate using sign language. According to one implementation, if the program 200 determines that one or more members in the audience of the web conference communicate using sign language (step 306, "YES" branch), the program 200 may continue to step 308 to analyze the collected IoT data from the IoT devices 250 to interpret the gestures and/or spoken language(s) of a presenter on the web conference. The program 200 may determine that one or more members in the audience of the web conference communicate using sign language based on the program's 200 analysis of the user's profile, the profiles of the members in the audience of the web conference, and contextual information. If the program 200 determines that no members in the audience of the web conference communicate using sign language (step 306, "NO" branch), the program 200 may terminate.

At 308, the program 200 dynamically analyzes the collected IoT data from the IoT devices 250 to interpret the gestures and/or spoken language(s) of a presenter at the web conference. A presenter may comprise a person who is speaking at a web conference. The IoT devices 250 can detect the gestures and facial expressions of a presenter. Additionally, the IoT devices 250 can capture a presenter's voice. The program 200 can identify a presenter's voice language, such as English, Japanese, Chinese, etc., and sign language, such as American Sign Language, Australian Sign Language, French Sign Language, etc., based on the collected IoT data. The program 200 can use machine learning models, such as deep learning algorithms, and natural language processing algorithms, to process the captured data from the IoT devices 250 and to determine the type of sign language used by a presenter. The program 200 can train the machine learning models and natural language processing algorithms using language data and training data. Language data may comprise sign language samples and voice samples that are uploaded to the program 200. The sign language samples can be tagged with the type of sign language that each sample is. Additionally, voice samples can be mapped to their respective sign language samples. Training data can comprise video streams and audio streams that are uploaded to the program 200. For each video stream, the program 200 can analyze the video stream and convert the sign language gestures to text. The program 200 can analyze the text and can generate the corresponding type of sign language. For each audio stream, the program 200 can analyze the audio stream and can convert the speech into text. The program 200 can analyze the text and can generate the corresponding type of sign language.

At 310, the program 200 dynamically translates the interpreted gestures and/or spoken language of the presenter into the type of sign language that the user understands. The program 200 can use the trained machine learning models to interpret the spoken language and translate it into sign language. The program 200 can analyze the audio stream and can convert the speech into text. The program 200 can analyze the text and can generate the corresponding type of sign language. Additionally, if a presenter is communicating using sign language, the program 200 can analyze the video stream and convert the sign language gestures to text. The program 200 can analyze the text and can generate the corresponding type of sign language. The program 200 may continuously update the machine learning models and the natural language processing algorithms based on user feedback. User feedback may comprise feedback related to the program's 200 performance in its interpreting and translating of spoken language and sign language, and the displaying of digital avatars.

At 312, the program 200 generates a digital avatar using AI-based computer graphics software. The program 200 can create a digital avatar based on a user's preferences. The digital avatar can interpret the content of the web conference. More specifically, the digital avatar can dynamically mimic the gestures and facial expressions of a presenter, in the type of sign language understood by the user. The generated digital avatar can translate the gestures and/or the spoken language of the presenter into the type(s) of sign language that the user communicates using.

In some embodiments of the invention, the program 200 may dynamically switch a digital avatar based on real-time events and speech identification. The program 200 may switch the digital avatar to a different digital avatar that can translate the language of a presenter to the type of sign language that a user understands, such as by switching the sign language package that the digital avatar comprises. For example, if there are multiple presenters in a web conference, the program 200 may switch the digital avatar to an avatar that can interpret the current voice/language being spoken/signed, each time the program 200 detects that a new presenter who speaks/signs a different type of language than the previous presenter begins presenting.

At 314, the program 200 displays a digital avatar along with the appropriate sign language gestures. The program 200 can dynamically display the digital avatar and corresponding sign language movements based on the detected sign language(s) of a presenter and the members of the audience of the web conference who require sign language to communicate, on the user's screen during the web conference. The program 200 can integrate the digital avatar into the video conferencing platform, such that the avatar appears alongside the video stream of a presenter. The program 200 may display the translated sign language on a small screen embedded alongside the web conference. For example, the digital avatar of a person may be displayed, or the sign language gestures may appear as projected directly onto a surface. Additionally, any digital avatars that are generated for users in the audience of the web conference may be available for other members in the audience of the web conference to select as their preferred display option. The available digital avatars may be selectable in a drop-down list by a user on the user's graphical user interface.

Figure 4:
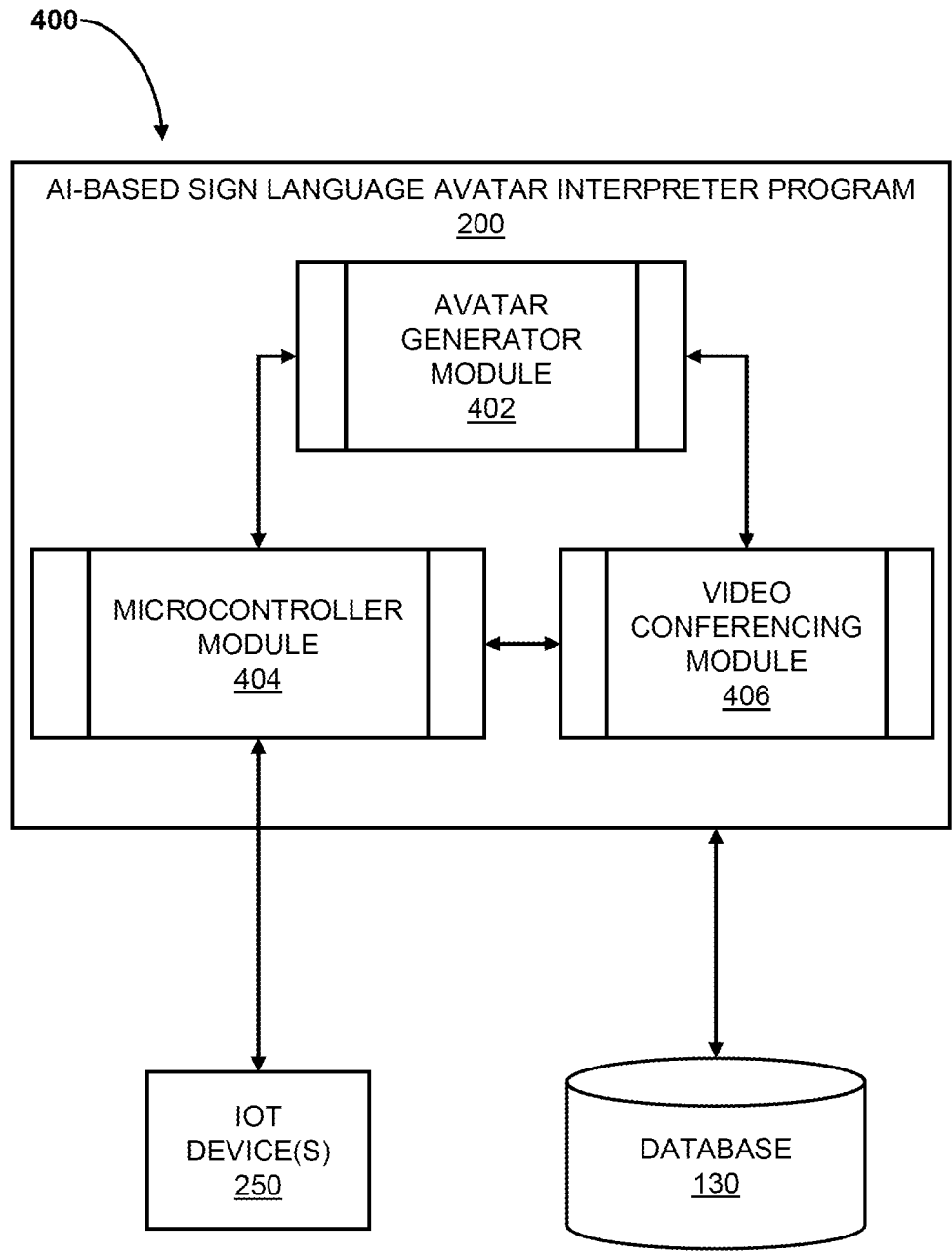
FIG. 4 is a system diagram illustrating an exemplary program environment of an implementation of an AI-based sign language avatar interpreter process according to at least one embodiment.

Referring now to FIG. 4, a system diagram illustrating an exemplary program environment 400 of an implementation of an AI-based sign language avatar interpreter process 300 is depicted according to at least one embodiment. Here, the program 200 comprises an avatar generator module 402, a microcontroller module 404, and a video conferencing module 406. The exemplary program environment 400 details the interactions between the avatar generator module 402 and the microcontroller module 404, the avatar generator module 402 and the video conferencing module 406, and the microcontroller module 404 and the video conferencing module 406. Additionally, the exemplary program environment 400 details the interactions between the microcontroller module 404 and the IoT device(s) 250, and the AI-based sign language avatar interpreter program 200 and the database 130.

The avatar generator module 402 may be used to generate and control the actions of the digital avatar. The microcontroller module 404 may be used to communicate with the IoT device(s) 250, to apply machine learning algorithms, and to translate spoken voice into sign language using voice recognition technology. The video conferencing module 406 may be used to access the video and audio streams of a web conference.

It may be appreciated that FIGS. 2 through 4 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for detecting, interpreting, and translating sign language in an active web conference, the method comprising:

responsive to detecting, via speech recognition and object detection techniques, an active web conference on a video conferencing platform, determining, by classification machine learning algorithms, that a member of an audience of the active web conference communicates using a type of sign language based on information detected in a user profile associated with the member of the audience;

based on the determination that the member of the audience communicates using the type of sign language, capturing gestures, facial expressions, and spoken language of a presenter on the active web conference using one or more Internet of Things devices;

translating, by trained machine learning models, the gestures and the spoken language of the presenter into the type of sign language;

generating, based on AI-based computer graphics, a personalized digital avatar corresponding to user preferences detected in the user profile, wherein generating the personalized digital avatar further comprises querying the user preferences to detect, identify, and display a preferred digital avatar for which the personalized digital avatar is based, among a plurality of different avatars, and to assign the personalized digital avatar a sign language package; and displaying the personalized digital avatar along with dynamic sign language movements using the personalized digital avatar, wherein the personalized digital avatar dynamically mimics the gestures and the facial expressions of the presenter in the type of sign language understood by the member of the audience, and wherein the personalized digital avatar is integrated into the video conferencing platform such that the personalized digital avatar appears alongside a video stream of the presenter.

2. The processor-implemented method of claim 1, further comprising:

determining if one or more members of the audience of the active web conference communicate using one or more types of sign language.

3. The processor-implemented method of claim 1, further comprising processing the captured gestures, the facial expressions, and the spoken language of the presenter to interpret the captured gestures, the facial expressions, and the spoken language of the presenter using machine learning models and natural language processing algorithms.

4. The processor-implemented method of claim 1, further comprising:

switching, dynamically, the personalized digital avatar based on real-time events and speech identification.

5. The processor-implemented method of claim 1, wherein the translating of the gestures and the spoken language of the presenter into the type of sign language may comprise translating one type of sign language into a different type of sign language.

6. The processor-implemented method of claim 1, wherein the displaying of the personalized digital avatar along with the dynamic sign language movements comprises interpreting content of the web conference.

7. A computer system for detecting, interpreting, and translating sign language, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

responsive to detecting, via speech recognition and object detection techniques, an active web conference on a video conferencing platform, determining, by classification machine learning algorithms, that a member of an audience of the active web conference communicates using a type of sign language based on information detected in a user profile associated with the member of the audience;

based on the determination that the member of the audience communicates using the type of sign language, capturing gestures, facial expressions, and spoken language of a presenter on the active web conference using one or more Internet of Things devices;

translating, by trained machine learning models, the gestures and the spoken language of the presenter into the type of sign language;

generating, based on AI-based computer graphics, a personalized digital avatar corresponding to user preferences detected in the user profile, wherein generating the personalized digital avatar further comprises querying the user preferences to detect, identify, and display a preferred digital avatar for which the personalized digital avatar is based, among a plurality of different avatars, and to assign the personalized digital avatar a sign language package; and displaying the personalized digital avatar along with dynamic sign language movements using the personalized digital avatar, wherein the personalized digital avatar dynamically mimics the gestures and the facial expressions of the presenter in the type of sign language understood by the member of the audience, and wherein the personalized digital avatar is integrated into the video conferencing platform such that the personalized digital avatar appears alongside a video stream of the presenter.

8. The computer system of claim 7, further comprising:

determining if one or more members of the audience of the active web conference communicate using one or more types of sign language.

9. The computer system of claim 7, further comprising processing the captured gestures, the facial expressions, and the spoken language of the presenter to interpret the captured gestures, the facial expressions, and the spoken language of the presenter using machine learning models and natural language processing algorithms.

10. The computer system of claim 7, further comprising:

switching, dynamically, the personalized digital avatar based on real-time events and speech identification.

11. The computer system of claim 7, wherein the translating of the gestures and the spoken language of the presenter into the type of sign language may comprise translating one type of sign language into a different type of sign language.

12. The computer system of claim 7, wherein the displaying of the personalized digital avatar along with the dynamic sign language movements comprises interpreting content of the web conference.

13. A computer program product for detecting, interpreting, and translating sign language, the computer program product comprising:

one or more computer-readable tangible storage medium and program instructions stored on at least one of the one or more tangible storage medium, the program instructions executable by a processor to cause the processor to perform a method comprising:

responsive to detecting, via speech recognition and object detection techniques, an active web conference on a video conferencing platform, determining, by classification machine learning algorithms, that a member of an audience of the active web conference communicates using a type of sign language based on information detected in a user profile associated with the member of the audience;

based on the determination that the member of the audience communicates using the type of sign language, capturing gestures, facial expressions, and spoken language of a presenter on the active web conference using one or more Internet of Things devices;

translating, by trained machine learning models, the gestures and the spoken language of the presenter into the type of sign language;

generating, based on AI-based computer graphics, a personalized digital avatar corresponding to user preferences detected in the user profile, wherein generating the personalized digital avatar further comprises querying the user preferences to detect, identify, and display a preferred digital avatar for which the personalized digital avatar is based, among a plurality of different avatars, and to assign the personalized digital avatar a sign language package; and displaying the personalized digital avatar along with dynamic sign language movements using the personalized digital avatar, wherein the personalized digital avatar dynamically mimics the gestures and the facial expressions of the presenter in the type of sign language understood by the member of the audience, and wherein the personalized digital avatar is integrated into the video conferencing platform such that the personalized digital avatar appears alongside a video stream of the presenter.

14. The computer program product of claim 13, further comprising:

determining if one or more members of the audience of the active web conference communicate using one or more types of sign language.

15. The computer program product of claim 13, further comprising processing the captured gestures, the facial expressions, and the spoken language of the presenter to interpret the captured gestures, the facial expressions, and the spoken language of the presenter using machine learning models and natural language processing algorithms.

16. The computer program product of claim 13, further comprising:

switching, dynamically, the personalized digital avatar based on real-time events and speech identification.

17. The computer program product of claim 13, wherein the translating of the gestures and the spoken language of the presenter into the type of sign language may comprise translating one type of sign language into a different type of sign language.

* * * * *